US 11,194,745 B1

(12) United States Patent
Sohail et al.

(10) Patent No.: US 11,194,745 B1
(45) Date of Patent: Dec. 7, 2021

(54) REPLICATION ENHANCEMENT METHOD FOR WRITE-INTENSIVE IOT APPLICATIONS

(71) Applicant: EMC IP Holding Company LLC, Hopkinton, MA (US)

(72) Inventors: Mohamed Abdullah Gommaa Sohail, Giza (EG); Said Tabet, Austin, TX (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 0 days.

(21) Appl. No.: 17/082,817

(22) Filed: Oct. 28, 2020

(51) Int. Cl.
*G06F 13/20* (2006.01)
*G06F 16/27* (2019.01)
*G06F 3/06* (2006.01)

(52) U.S. Cl.
CPC .............. *G06F 13/20* (2013.01); *G06F 3/061* (2013.01); *G06F 3/065* (2013.01); *G06F 3/0655* (2013.01); *G06F 3/0679* (2013.01); *G06F 16/27* (2019.01); *G06F 2213/0064* (2013.01)

(58) Field of Classification Search
CPC .......... G06F 13/20; G06F 16/27; G06F 3/061; G06F 3/065; G06F 3/0655; G06F 3/0679; G06F 2213/0064
See application file for complete search history.

(56) References Cited

U.S. PATENT DOCUMENTS

| | | | |
|---|---|---|---|
| 2012/0303842 A1* | 11/2012 | Cardinell | G06F 9/505 710/22 |
| 2018/0004703 A1* | 1/2018 | Sharma | G06F 13/4282 |
| 2019/0034244 A1* | 1/2019 | Yang | H04L 12/4641 |
| 2019/0340043 A1* | 11/2019 | Trulli, Jr. | G06F 9/546 |

* cited by examiner

*Primary Examiner* — Henry Tsai
*Assistant Examiner* — John B Roche
(74) *Attorney, Agent, or Firm* — Workman Nydegger

(57) ABSTRACT

One example method includes receiving an IO request from an application, determining if an affinity policy applies to the application that transmitted the IO request, when an affinity policy applies to the application, directing the IO request to a specified site of a replication system, when no affinity policy applies to the application, determining if a lag in replication of the IO request from a primary site to a replication site is acceptable, if a lag in replication of the IO request is acceptable, processing the IO request using performance based parameters and/or load balancing parameters, and if a lag in replication of the IO request is not acceptable, either directing the IO request to a most up to date replica site, or requesting a clone copy of a volume to which the IO request was initially directed and directing the IO request to the cloned copy.

20 Claims, 8 Drawing Sheets

REPLICATION ENHANCEMENT METHOD FOR WRITE-INTENSIVE IOT APPLICATIONS

FIELD OF THE INVENTION

Example embodiments of the present invention generally relate to data replication. More particularly, at least some embodiments of the invention relate to systems, hardware, software, computer-readable media, and methods for replication enhancement for write-intensive IoT applications.

BACKGROUND

Cloud computing services are provided to millions of users around the globe, and Quality of Service (QoS) is a critical consideration for successful service delivery, and for meeting the service level agreement with the cloud customers, particularly with regard to IoT (Internet of Things) eco-systems. Because a network of IoT devices may generate a large amount of data, write throughput in industrial IoT is one of the main performance metrics that impact the service quality. Data replication in cloud computing may depend on the use of several remote datacenters for data protection. In some cases, such as social network cloud computing for example, replica sites may also be used in an attempt to minimize the delay of reading the data, and may also be used to employ data deduplication, and to avoid the need to rewrite a similar save set twice. Some data protection systems may rely on the use of several datacenters for remote replication. However in most cases, replica sites only act as data recovery which lacks full utilization and are not well suited to support write-intensive applications.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
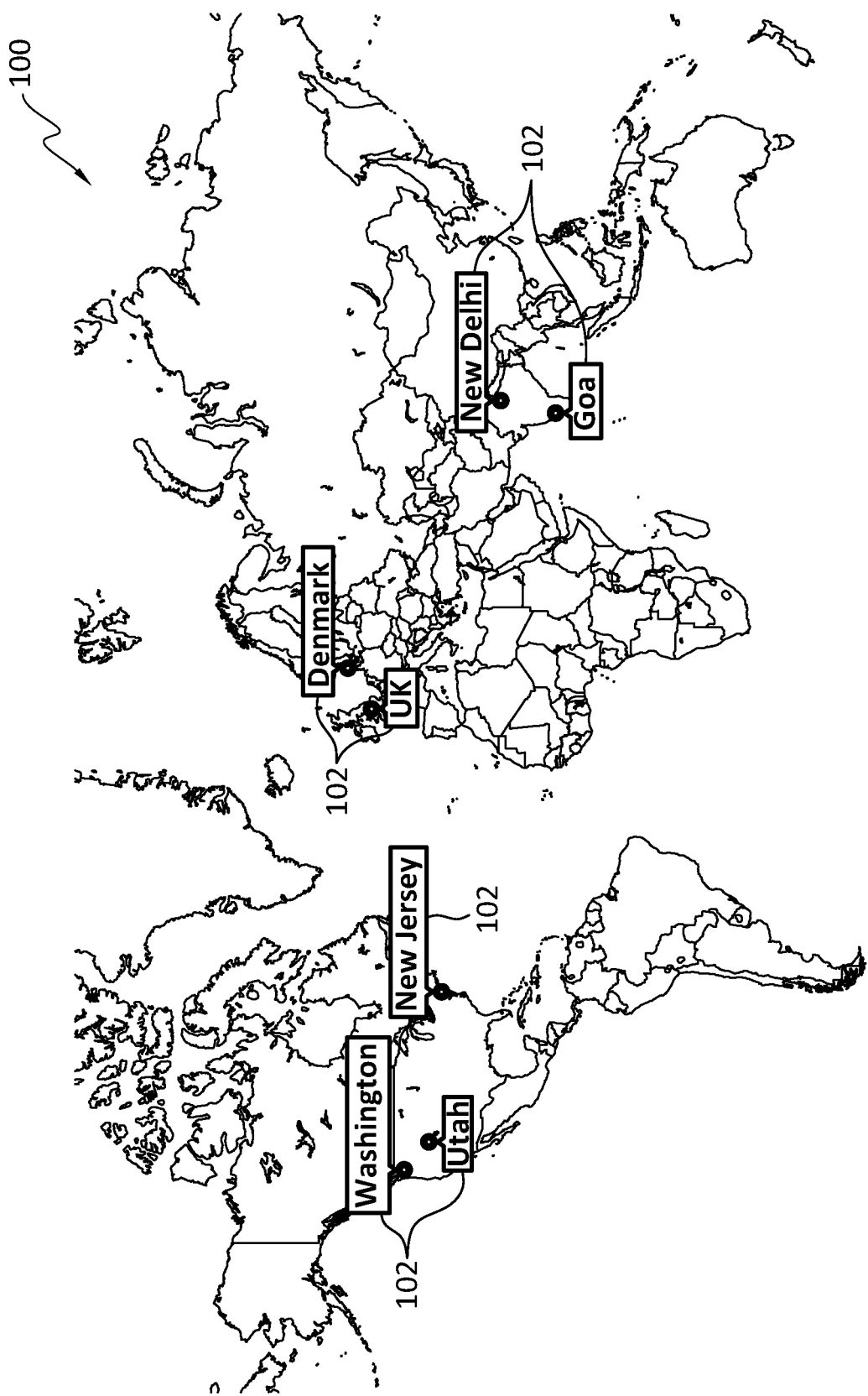
FIG. 1 discloses aspects of a cloud computing datacenter map.

Example embodiments of the present invention generally relate to data replication. More particularly, at least some embodiments of the invention relate to systems, hardware, software, computer-readable media, and methods for replication enhancement for write-intensive IoT applications.

For example, some embodiments of the invention embrace approaches that may boost the performance of write intensive applications, such as industrial IoT applications for example, in various environments, including those in which cloud storage may be employed. With regard to such example embodiments, it is noted that one example environment may be a multi-cloud computing environment comprising a global network with multi-continent connection. In such environments, signal propagation delay, or latency, is a significant parameter in the cloud read/write access performance. Thus, at least some example embodiments may operate to boost the write latency/bandwidth performance in cloud computing systems including, but not limited to, cloud computing systems that involve the use of IoT devices and IoT applications.

In some embodiments, improvements in latency, that is, latency reduction, may be achieved, for example, through the use of a replica-aware and performance-aware layer, which may be referred to herein as a routing layer, that may coordinate with a replication system in order to choose the fastest path to write the data, and to enable an elastic and dynamic way to determine the best option to achieve the highest performance method to write the produced data. A cloud enabled service (CES) may be provided that transparently and intelligently chooses the write action to achieve the best performance and, thus, a replica site may be fully utilized so as to thereby minimize the write penalty.

Example embodiments may provide enhancement and intelligence for write intensive applications such as industrial IoT use-case with data analytics, database, web applications. However, no embodiment is required to be employed in any particular application or context.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that latency may be reduced, such as in the case of write-intensive applications, by automatically determining an optimal way to handle a write request. In one embodiment, a routing layer may direct write requests, such as IoT app requests, to a primary storage site as a default, but may direct read requests to the proper site automatically and intelligently using advanced policy control. An embodiment of the invention may operate to minimize write delay by optimizing the propagation delay from the cloud user to the datacenter, and from the datacenter to the cloud user.

A. Overview

Many IoT application use-cases, as well as some cloud-based applications, may exhibit particular characteristics, examples of which are addressed hereafter. For example, these applications and use-cases may be data intensive. That is, massive amounts of data may be generated continuously from a substantial number of sensors and other types of IoT devices. For example, a smart field may have a sensor located every 1~10 meters, such that 1 million sensors could be present in a 10 $km^2$ field. If it were assumed, for the purposes of illustration, that 1 KB of data, such as humidity or sensor data for example, is generated by each sensor each minute, the group of sensors would, in one day, collectively generate about 1 Tb of data that would need to be ingested and/or otherwise processed. As another example, IoT devices such as video surveillance systems may generate even greater amounts of data, along with rich metadata, all of which may need to be written to a backend.

A further example characteristic of some cloud based applications and IoT use cases is that the data generated by those applications must be globally accessible by multiple users. Particularly, after the huge amounts of data generated by these applications are ingested, that data may be accessed globally, and reproduced, such as by different users (Apps) from different locations (across sites, cities or countries) for different purposes. This will be more and more important and common as such data, once shared, can be much easier to access or to analyze by different organizations and service consumers, which greatly boosts digital transformation and overall efficiency and productivity.

Further, such applications and use cases may require distinct read and write operations. For example, data generated by IoT devices such as edge sensors and other devices, for example, may be ingested to a cloud storage site, and may then be distributed or replicated to a few data centers, or other sites, for consumption and data analytics. This data may be leveraged for actuation, insights, third party service consumption, and various other purposes. Moreover, many IoT applications are write intensive, such as industrial IoT applications which may generate terabytes of data every hour, and such data may need to be persistently stored.

If considering the aforementioned illustrative IoT use-case and patterns, data replication and global sharing may be an important part of the core building blocks. As shown in the example configuration 100 in FIG. 1, a group of datacenters 102 may be geographically distributed across the globe.

Products such as the DellEMC RecoverPoint platform for VMs (vRPA) may be employed in such scenarios. vRPA is a data protection and disaster recovery system which may replicate the data on the LUN level from a primary production site, such as one of the datacenters 102, to one or more remote sites (CRR), such as one or more of the other datacenters 102, or for local replication at the same site (CLR), or support CDP (Continuous Data Protection), as shown in FIG. 1. However, current vRPA systems and configurations may be problematic. For example, current Recover Point (RPO system definitions may specify that the remote replication sites are used to recover data only in case of data corruption, or when a disaster occurs and there is a need for failover. This is because the remote replication Logical Unit Numbers (LUNs) may be accessible only by the vRPA at the target sites where the recovered data is to be written.

Recently, many customers such as telecom operators, public sectors, and Internet service providers, are relying on edge computing and public cloud computing for IaaS (Infrastructure as a Service), PaaS (Platform as a Service) and SaaS (Software as a Service) provisioning. Some cloud computing infrastructures may depend on the use of several datacenters for data protection, high availability of the data, and high read/write performance.

Figure 2:
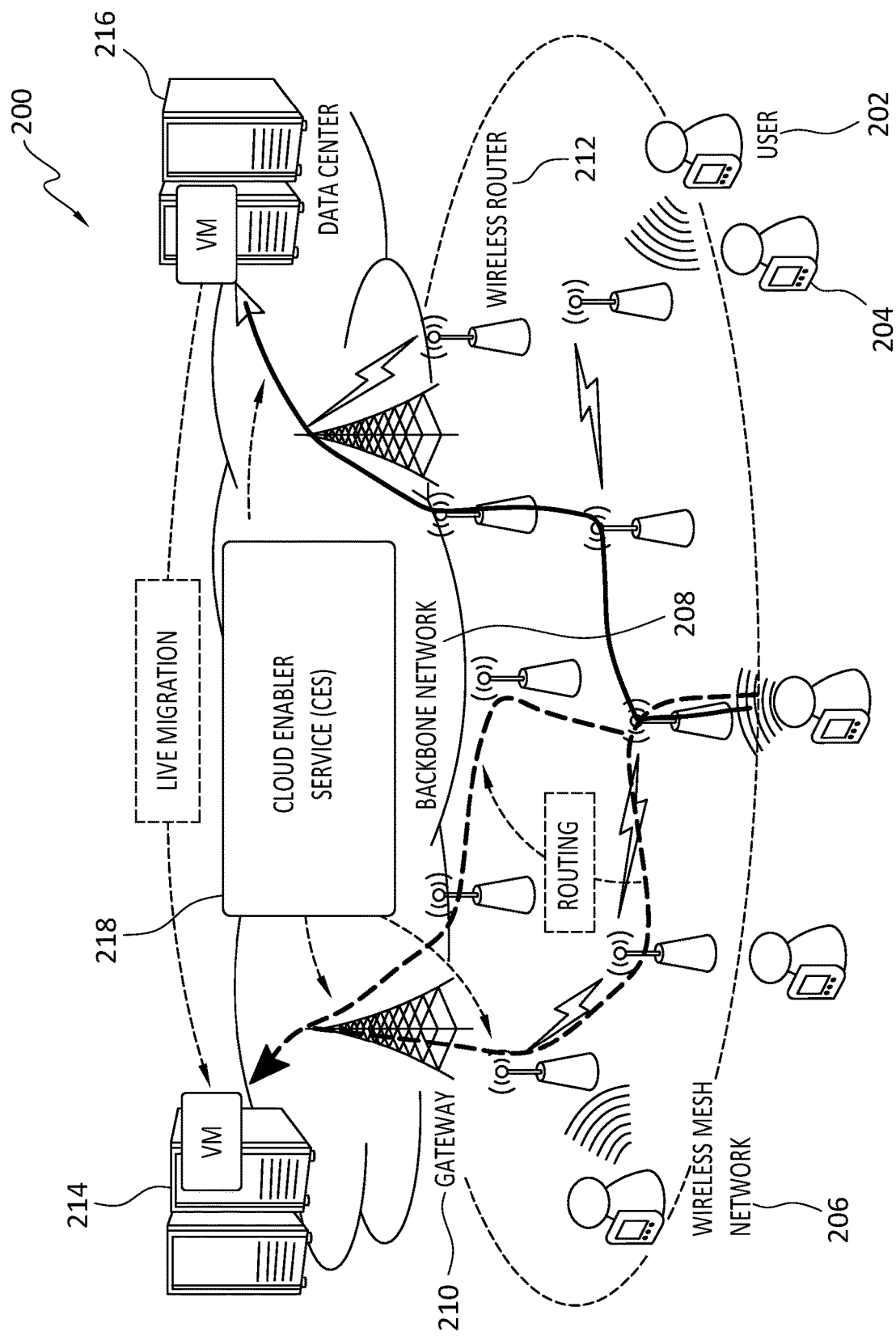
FIG. 2 discloses aspects of an example operating environment.

By way of illustration, and with reference now to the example configuration 200 in FIG. 2, each user 202 in a group may be operating an IoT device 204 and/or other edge device connected to a wireless mesh network 206 that, in turn, may communicate with a backbone network 208. The wireless mesh network 206 may include, or communicate with, one or more gateways 210 and wireless routers 212. Thus, a user 202 may communicate with one or more virtual machines (VM) 214 and a datacenter 216 that may include one or more virtual machines. As further indicated in FIG. 2, and discussed below, a Cloud Enabler Service (CES) 218 may be provided that, among other things, handles migration of data between the VMs 214, which may comprise a replica site, and the datacenter 216. In general, the CES 218 may handle manage reads and writes from/to the replica site and the datacenter 216.

More particularly, a cloud computing infrastructure may be constructed that employs, using a CES, one or more replica sites in order to optimize cloud computing data read latency and bandwidth. This approach may thus integrate with replication systems for cloud computing environment so as to maximize, or at least improve, the throughput and latency performance for write operations between one or more users, such as write intensive applications, and one or more replication sites. In some cases, embodiments may take the form of a cloud replication system on which a CES is layered, although the scope of the invention is not limited to that example configuration.

Some embodiments of the invention may provide solutions to various problems or shortcomings in the art. One of such problems concerns industrial IoT systems and autonomous vehicles. Both of these may present challenges as they may include various application running on top of the IoT data and producing large amounts of data, such as in the Tb range. Rather than modifying these systems and applications, some embodiments of the invention may provide for approaches which may boost write performance while accommodating the write heavy nature of these systems and applications. As noted, some example embodiments may thus employ an enhanced layer, which may coordinate with replication systems such as DellEMC RecoverPoint (RP), underneath the IO path, and this layer may be configured and operate so that the configuration and operation of the existing write intensive applications may remain unchanged. Such an approach to the CES layer may thus enable ready integration of that layer in existing infrastructures.

Another shortcoming that may be addressed by some embodiments of the invention concerns performance requirements, such as bandwidth and latency, in cloud computing. Particularly, meeting such performance requirements in cloud computing platforms and applications is a challenge for quality of service (QoS) satisfaction. For example, propagation delay, or latency, is a function of the distance between the cloud user and the datacenter and it has a dominant impact on the overall delay in cloud computing. As well, bandwidth and throughput, the volume of IOs (Input/Output operations) that can be handled, are important for data analytics such as loading massive data. Thus, there is high demand to minimize the IoT data write latency especially for write-intensive applications. Typically however, storage back-end in cloud computing is not IoT aware and does not optimize data handling to enhance IoT cloud performance. Embodiments of the invention, some of which comprise a CES layer may provide an approach to write operations that optimizes the speed with which such write operations can be carried out, given physical and/or operational constraints, by routing the write operation in such a way as to maximize, or at least improve, resource utilization.

B. Aspects of Some Example Operating Environments

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of operations including, but not limited to, data migration operations, data replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in an environment such as is disclosed in FIG. 2, discussed above. As well, embodiments may be implemented in data protection platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected, generated, replicated, restored, or otherwise handled, in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud environments, which may or may not be public, include cloud storage environments that may provide data protection functionality for one or more clients. Another example of a cloud environment is a cloud computing environment in which processing, data protection, and other, services may be performed on behalf of one or more clients. Some example cloud computing and/or storage environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more systems and devices, such as IoT systems and devices for example, that are capable of collecting, modifying, transmitting, receiving, storing, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

Finally, as used herein, the term 'backup' is intended to be broad in scope. As such, example backups in connection with which embodiments of the invention may be employed include, but are not limited to, full backups, partial backups, clones, snapshots, and incremental or differential backups.

C. Further Aspects of Some Example Embodiments

During the last decade, various approaches have been deployed to make use of IoT with cloud computing services for critical and non-critical applications in various industry verticals. Now, many market leaders are indicating interest in utilizing public and private cloud computing services. For example, Amazon AWS, Microsoft Azure, Salesforce and, recently, VMware Virtustream are attracting customers from several sectors globally by offering SaaS, IaaS and PaaS. With this background in view, at least some embodiments of the invention embrace techniques that may enhance live migration and replication systems, such as cloud computing systems handling IoT workloads for example, to automatically and intelligently minimize the data write latency and/or bandwidth requirements associated with the write request workloads imposed by IoT devices and/or other systems and devices. Thus, example embodiments may enhance cloud service quality, and may be especially beneficial for write intensive applications such as, but not limited to, IoT data analytics, databases, unstructured data streaming, and web-based applications.

Figure 3:
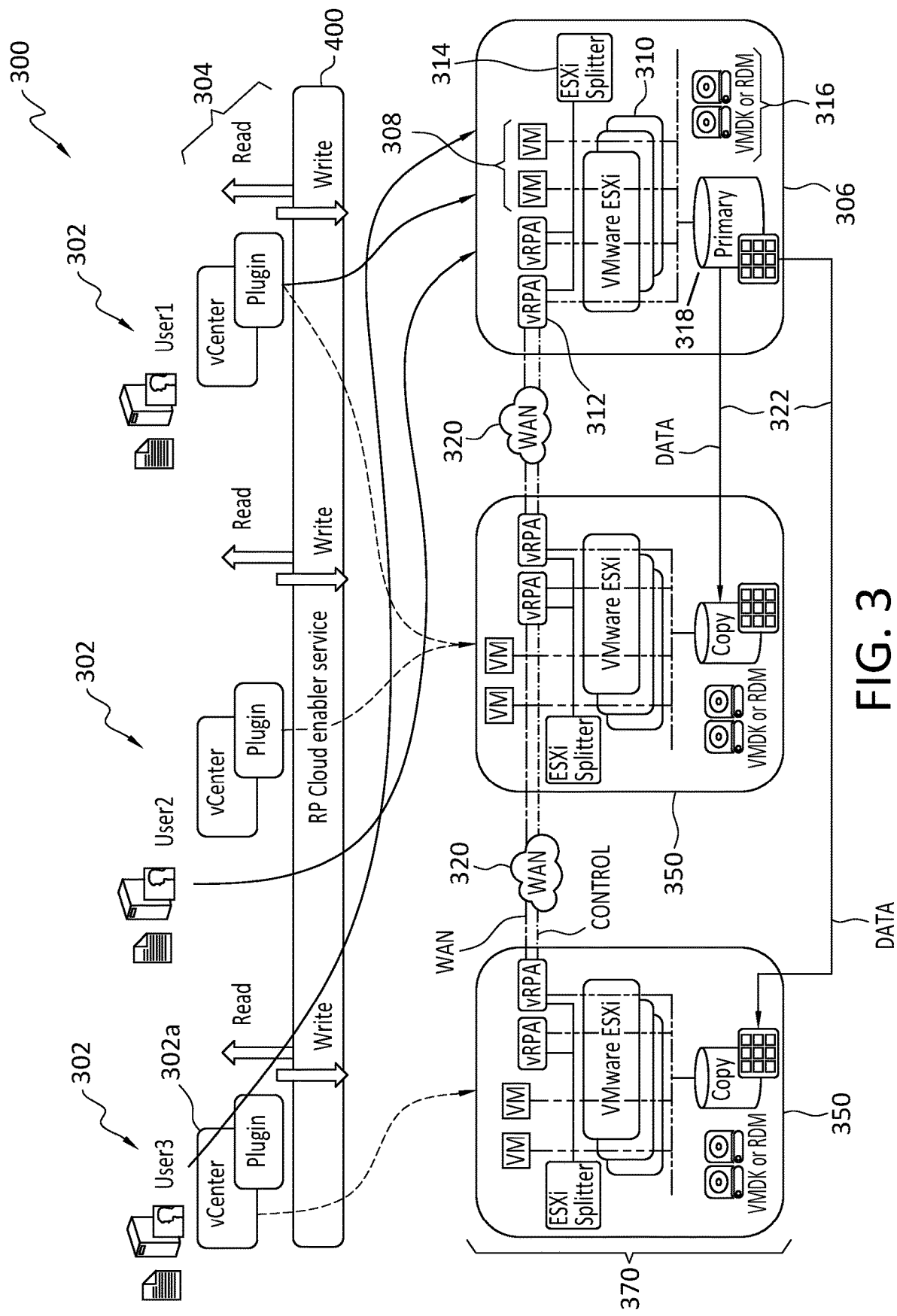
FIG. 3 discloses aspects of a cloud enabled vRPA for VMs system.
Figure 4:
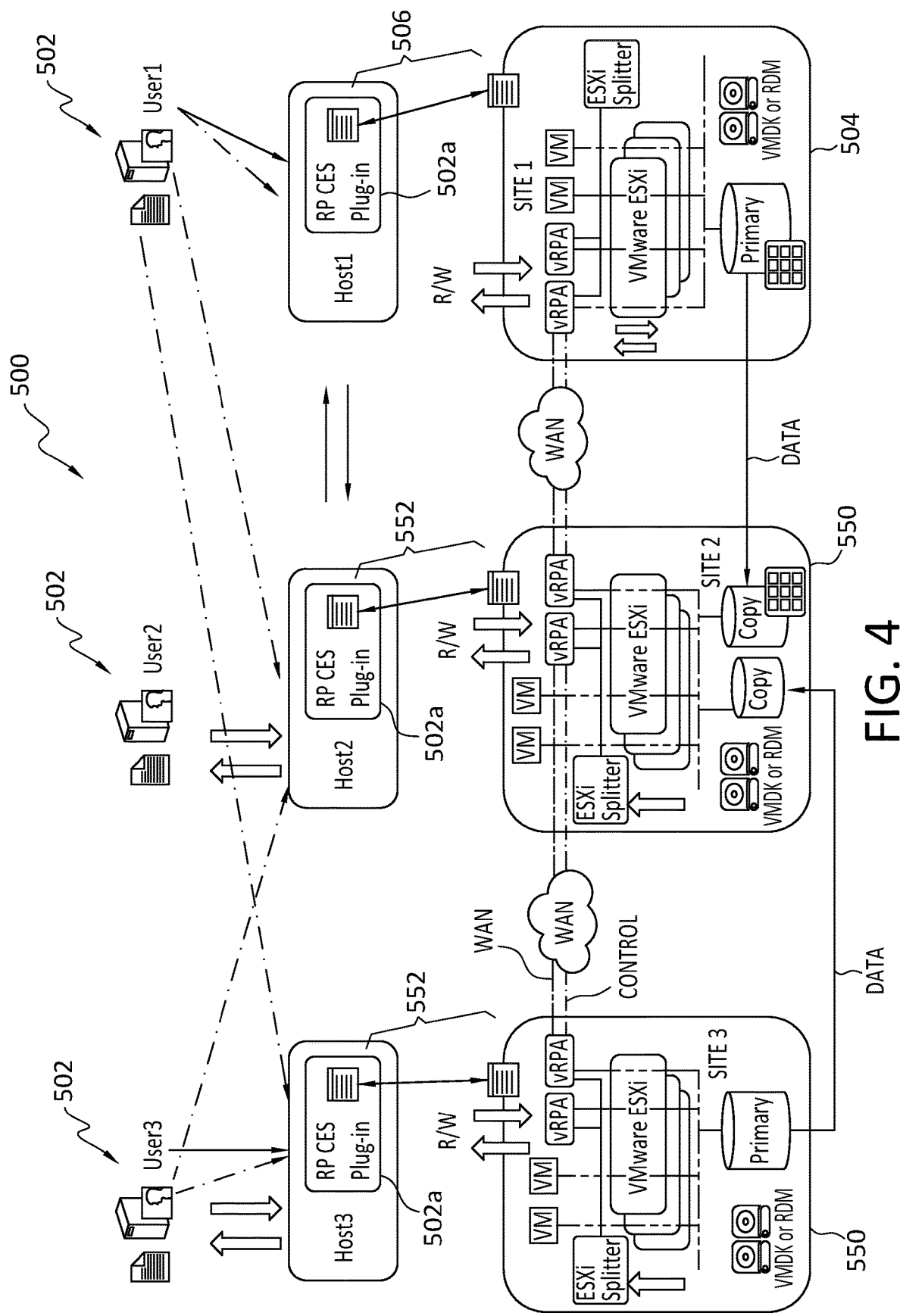
FIG. 4 discloses aspects of a CES approach to write-intensive applications.

With particular attention now to FIGS. 3 and 4, further details are provided concerning aspects of some example embodiments. As shown in the example configuration 300 of FIG. 3, various users 302, which may or may not operate in a cloud computing environment, may generate read and write requests 304. Any one or more of the users 302 may comprise one or more data generators, examples of which include, but are not limited to, applications such as those disclosed herein, edge devices such as mobile phones for example, and IoT devices such as, for example, sensors configured to detect a physical aspect of a physical environment, or an operational aspect of software and/or hardware. More generally, a data generator may be any system, device, and/or software that is able to generate data. In one example embodiment, the users 302 may collectively form a network of IoT devices (see, e.g., FIG. 2), although that is not necessarily required.

With continued reference to FIG. 3, one or more of the users 302 may include an instance of data management client 302a, such as the vCenter plugin for example. In general, the data management client 302a may interact with a data management server application, such as vCenter for example, that runs a virtualized primary data storage and management site 306. As shown in FIG. 3, the data storage and management environment may comprise one or more virtual machines (VM) 308 that are controlled by a hypervisor 310, such as the VMware ESXi platform. One or more appliances 312, such as a virtual Recover Point Appliance (RPA) for example, may be provided that manage data replication and protect the VMs 308. A splitter 314, such as an ESXi splitter, may split IOs received from the users 302 among one or more VMDKs 316, and the IOs may be directed to storage 318.

As further indicated in FIG. 3, the primary data storage and management site 306 may comprise, or at least communicate with, one or more replica sites 350. Such communication may take place, for example, by way of a network 320, such as a wide area network (WAN) for example. The replicate sites 350 may have a similar, or identical, configuration as each other and/or as the primary data storage and management site 306. In general, data at the primary data storage and management site 306 may be replicated 322 to one or more of the replica sites 350. The replica sites 350 and the primary data storage and management site 306 collectively form a portion of an example embodiment of a replication system 370. A CES layer, one example of which is discussed below, may or may not be a part of the replication system 370 and, when provided as part of a replication system 370, the CES layer may be implemented, for example, in a cloud storage site. However, no particular implementation or location of a CES layer is required. Finally, and as shown in FIG. 3, one or more of the networks 320 may be connected by a network path, such as a WAN path, and a control path by way of which control signals concerning replication may be passed between the replica sites 350 and the primary data storage and management site 306.

With continued reference to FIG. 3, a Cloud Enabler Service layer (CES) 400 may be provided. In general, the CES 400 may operate as an add-on module that is able to communicate with a replication system, such as Recover-Point for VMs for example, implemented by the primary data storage and management site 306 and replica sites 350. Among other things, the CES 400 may automatically detect the write performance of a request and consider various different parameters to identify the best way to handle this write request.

In more detail, the CES 400 may implement various functionalities including, but no limited to, load balancing of storage volumes in the primary data storage and management site 306 and the replica sites 350. As well, the CES 400 may provide for effective resource utilization by monitoring IOs from the users 302 and directing those IOs to relatively less busy replica sites 350 that may have relatively more bandwidth available and/or throughput capabilities than others of the replica sites 350. Any of the functions performed by, and/or at the direction of, the CES 400 may be implemented based on considerations such as latency and available bandwidth. However, any other performance parameters may also be taken into account by the CES 400 when implementing any of its functions. Some embodiments of the CES 400 may be particularly useful in achieving a relative reduction in the latency associated with IoT data writes, and the latency that may be associated with write intensive applications. Further details are now provided concerning some example functions that may be implemented by embodiments of the CES 400.

The first of such functionalities concerns write optimization. Particularly, the CES 400 may evaluate any requests from the users 302 to write large data chunks, and the CES 400 may either determine that the write can be carried out, while meeting latency and/or other constraints, or the CES 400 may determine that there is a need to optimize the write that has been requested. Such writes may be optimized in various ways, such as by managing and routing writes based on system constraints and parameters. As such, example embodiments of a CES may be referred to as implementing "routing layer" functionalities.

For example, in a typical machine-to-machine (M2M) communication, it may be easier, if sensor "A" needs to send data to sensor "B" over the network for example, for the CES 400 to send the requested data on the underlying storage layer, which may be inside the same datastore, or the storage, and send only the metadata and pointers in the M2M communication, rather than the actual data, over the network to save time and battery resources of the sensors. In this way, sensor "B" may access the data from sensor "A" by using the pointers and metadata.

Thus, the CES 400 may orchestrate M2M communications involving data. Moreover, for example, if all the storage is cloud based, there may be no need to send the data, particularly if the data is not expected to be read/processes right away, and it may be easier and faster to simply the "Data ownership" from one device to the other, and copy data internally inside the datacenter, such as the primary data storage and management site 306. In the example above, the ownership of the data would be changed from "Sensor A" to "Sensor B."

The approach implemented by the CES 400 just described may be especially well suited for use in M2M communications, such as in a 'smart city' operating environment. For example, IoT devices such as sensors (see, e.g., FIG. 2) may tend to operate primarily as data generators and aggregators. Such devices may not consume or process data instantly. Rather, these devices may simply store date locally further processing later by central data management servers. The lack of data consumption/processing by such devices may be important because, for example, sensors may be constrained in terms of parameters such as battery power and bandwidth and, as such, it may be desirable to minimize sensor traffic over a network.

Another aspect of a CES, such as the example CES 400, concerns replica awareness. Particularly, as a replication system 370 such as that disclosed in FIG. 3, or such as the DellEMC Recover Point (RP) platform for example, configures, or changes, its primary storage and replication storage, the routing layer functionality of the CES 400 may regularly pull and/or push such information so that the CES 400 remains apprised of the current configuration of the replication system 370. The CES 400 may update a local database, which may be accessible by the users 302 in some embodiments, with metadata indicating the configuration and state of the replication system 370. Thus, an application, such as a write-intensive application employed and/or hosted by a user 302, may be able to consult that metadata to determine where it may be best, in terms of write performance for example, for the application to write its data. Thus, depending upon the circumstances and performance parameters, the application may choose to write its data to a primary data storage site 306, or a replica site 350. As well, if a site, such as a replica site 350 for example, is lost or unavailable to the application for some reason, the primary data storage site 306 may push urgent messages to the CES 400, and may also clone the volume/LUN and make the clone writable for writes from the users 302. In this way, the user 302 may be affirmatively apprised as to the availability or non-availability, for writing, of one or more replica sites 350.

Still a further aspect of a CES, such as the example CES 400, concerns performance awareness. For example, the CES 400 may implement a routing layer running on a specific host such as one of the users 302, and the routing layer, together with an application at that host, may periodically check the access performance of the host to all available sites, including primary 306 and replica 350 data storage sites, and may periodically check performance parameters such as latency and bandwidth.

For example, in the background, the CES 400 may ping the primary 306/replica 350 data storage sites to collect networking latency information, and then rank the storage sites according to their respective latency. Additionally, or alternatively, the CES may, in the background in some cases, read some test data from the primary storage site 306 or replica site 350 and measure both latency and bandwidth (here performance covers both networking, processing and disk I/O. As another example of performance awareness functionality that may be implemented, the CES 400 may be configured to measure latency and bandwidth. Those performance measurements and data may be used later for the routing, by the CES 400, of 'read' traffic routing, and/or combined with other policies, discussed elsewhere herein, such as balancing, affinity and locality.

Embodiments of a CES, such the CES 400 for example, may implement load-awareness functionality. For example, the CES 400 may implement a routing layer that may operate to load balance its issued IO among multiple sites, such as replication sites for example. To illustrate, the routing layer may consider IOs in a round-robin fashion in which each successive IO is routed to the next successive site in a group of sites, or the routing layer may use respective performance measurements for each site as weights, which can then be used to determine the distribution of IOs among the various sites, where relatively good performance measurements may correspond to a relatively higher weight for a site, and the relatively higher weight for that site may correspond to direction of relatively more IOs to that site. A site with a relatively lower weight, as determined in terms of performance for example, may receive relatively fewer IOs from the routing layer.

Embodiments of a CES, such as the CES 400 for example, may provide various functionalities relating to lag awareness, locality, and affinity. With respect to lag awareness for example, if replication or CDP system configured multiple replica sites, as may be the case for enterprise users for example, even if all replica sites were running in CDP mode, data replication performance from the primary storage site 306 to each replica site 350 may be different due, for example, to unpredictable interconnection between the various replica sites 350 and the primary storage site 306. Thus, there may be a differential replication lag, that is, the speed with which data is replicated from the primary storage site 306 to a first replica site 350 may be different from the speed with which data is replicated from the primary storage site 306 to a second replica site 350. In such a case, the primary storage site 306 from which replication is performed may monitor such lag, and then report the lag to the routing layer, or the routing layer may pull the lag information from the primary storage site 306. With the lag information, the routing layer of the CES 400 may weight the various replication sites so that, for example, if an application needs more real-time data, the application may choose primary or the most updated replica site based on the weighting, where a relatively shorter lag time may correspond with a relatively greater weight, and a relatively longer lag time may correspond with a relatively lesser weight.

With regard to locality and consistency functionality of example embodiments of a CES, the CES may be configured to direct, for example, sensor/device write requests to the primary storage site 306. As subsequent requests may often be for data analysis of sensor data, those requests may be read-intensive. In the event of a read-after-write, such as when a device reads its own write, then such pattern can be detected. For example, the pattern might be 'read previous write within a time threshold' such as 30 seconds. Such a read may be directed by the routing layer to the primary storage site 306 as well. This approach may help to ensure data consistency, such as in a case where the write has not been replicated to a replica site, and may provide for relatively better read performance since the written data may be cached in networking (CDN) or primary storage site 306 memory.

Embodiments of a CES, such as the example CES 400, may also implement affinity functionality. For example, a user 302 may set pin affinity so that a particular application hosted by that user 302 may always access data from the pinned site, which may be a replica site 350, or the primary storage site 306, for example. This affinity functionality may be implemented for cost or compliance purposes. For example, there may be a security requirement that particular data from a particular application be written to a replica site that has specific security measures in place.

With reference now to FIG. 4, further details are provided concerning embodiments of a CES approach to write-intensive applications. Except as noted, the configuration 500 and its operation may be similar, or identical, to the configuration 300 and its operation. The same applies to each of the elements of the configuration 500, that is, the configuration and operation of each element of the configuration 500 may be similar, or identical, to the configuration and operation of the corresponding elements of the configuration 300.

The example configuration 500 may include a group of one or more users 502 that may transmit reads and writes to a primary data storage and management site 504 that may be similar, or identical, in its configuration and operation to the primary data storage and management site 306. The primary data storage and management site 504 may be a datacenter. In the example of FIG. 4, a separate CES layer may not be provided and, instead, one or more of the users 502 may include a respective CES plugin 502a, where each of the CES plugins 502a perform, for their respective user 502, any of the functions of a CES. As further indicated in FIG. 4, the configuration 500 may include one or more replica sites 550, each of which may take the form of a respective datacenter. The replica sites may also be referred to, and function as, as disaster recovery (DR) sites. The replica sites 550 may be similar, or identical, in their configuration and operation to the replica sites 350. In general, user data stored at the primary data storage and management site 504 may be replicated to the replica sites 550.

As well, each of the replica sites may include a metadata catalog 552 that may be synchronized across the replica sites 550 and users 502. Among other things, the metadata catalogs 552 may contain metadata concerning performance parameters of the replica sites 550. Likewise, the primary data storage and management site 504 may include a metadata catalog 506 that may be synchronized with one or more of the users 502, and the metadata catalog 506 may contain metadata concerning performance parameters of the primary data storage and management site 504. The metadata contained in the metadata catalogs 552 and 506 may be accessible by the users 502 and, particularly, the CES plugins 502a, so that the users 502 can make decisions as to where to send read and write requests.

Thus, for example, the best replica site 550, or primary data storage and management site 504, to which one or more user 502 read/write operations may be directed, may be selected by a user 502 in order to minimize the signal propagation and latency associated with a read or write operation, and to make best use of the available bandwidth of the replica site 550, or of the primary data storage and management site 504, as applicable. Additionally, or alternatively, considerations such as the datacenter proximity, the datacenter with the lowest IO load, and/or affinity setting of a datacenter, may be taken into consideration by a host 502, particularly a CES plugin 502a, when determining which datacenter, that is, which replica site 550 and/or primary data storage and management site 504, to which one or more read and/or write operations will be directed by the CES plugin 502a.

The CES plugins 502a may include built-in database, or may access a database, such as the catalog 552 for example, either or both of which may store metadata that includes the mapping of the primary data storage and management site 504 and the replica sites 550, and this database 552 may be synchronized with metadata stored at the replica sites 550 and/or metadata stored at the primary data storage and management site 504. Thus, these databases storing metadata may be accessed by the users 502 to make routing decisions concerning read and write requests.

To illustrate, and with continued reference to FIG. 4, User1 may be relatively close, in geographic terms, to the primary data storage and management site 504, so all R/W requests issued by User1 may be transmitted to the primary data storage and management site 504. On the other hand, User3 is closest to the leftmost (from the perspective of FIG. 4) replica site 550. Thus, write requests from User3 may continue to be directed to the primary data storage and management site 504, but read requests from User3 may be directed to the nearest replica site 550. In this way, at least the latency associated with those read requests may be relatively lower than if User3 directed its read requests to a more distant replica site 550 or to the primary data storage and management site 504.

As further indicated in FIG. 4, Site 2 may be used to facilitate the operations and to support the read requests coming from all the users 502, such as User1 and User3, with any lag and latency issues that may occur in connection with those read requests. However, a portion of the workload that was already written to Site1 in response to write requests from one or more of the users 502, may also be replicated from Site1 based on the parameters disclosed herein, where such parameters include "lag aware," "performance aware," and "replica aware" approaches. That portion of the workload at Site1 may be replicated to Site3, and then presented as a "WRITE" ready copy at Site3. This WRITE ready copy may be designated as "Primary" in Site3, and may be replicated to Site2 to serve read requests directed to Site2. That is, this "WRITE" ready copy at Site3 may then be used to serve all the potential write requests coming from User3, and possibly from User2 as well, so as to reduce the workload at Site1 in case of performance penalties that may otherwise be associated with performing that write work at Site1.

The approach just described may help in improving, such as by speeding up, the overall configuration 500 performance in the event that Site1 is overwhelmed with the write requests from User1, User2, and User3. Moreover, this approach may reduce the performance penalty associated with serving the write requests of User3, and possibly the write requests of User2 as well. Some read requests from User1 and User3 may thus be rerouted to Site 2 to support operations, as Site3 may now be serving the write requests. At the same time, the extra write request workload coming from User1 and User3 may be redirected to Site3 which may now be a primary site serving write requests with the WRITE ready copy that was replicated there from Site1.

Figure 5:
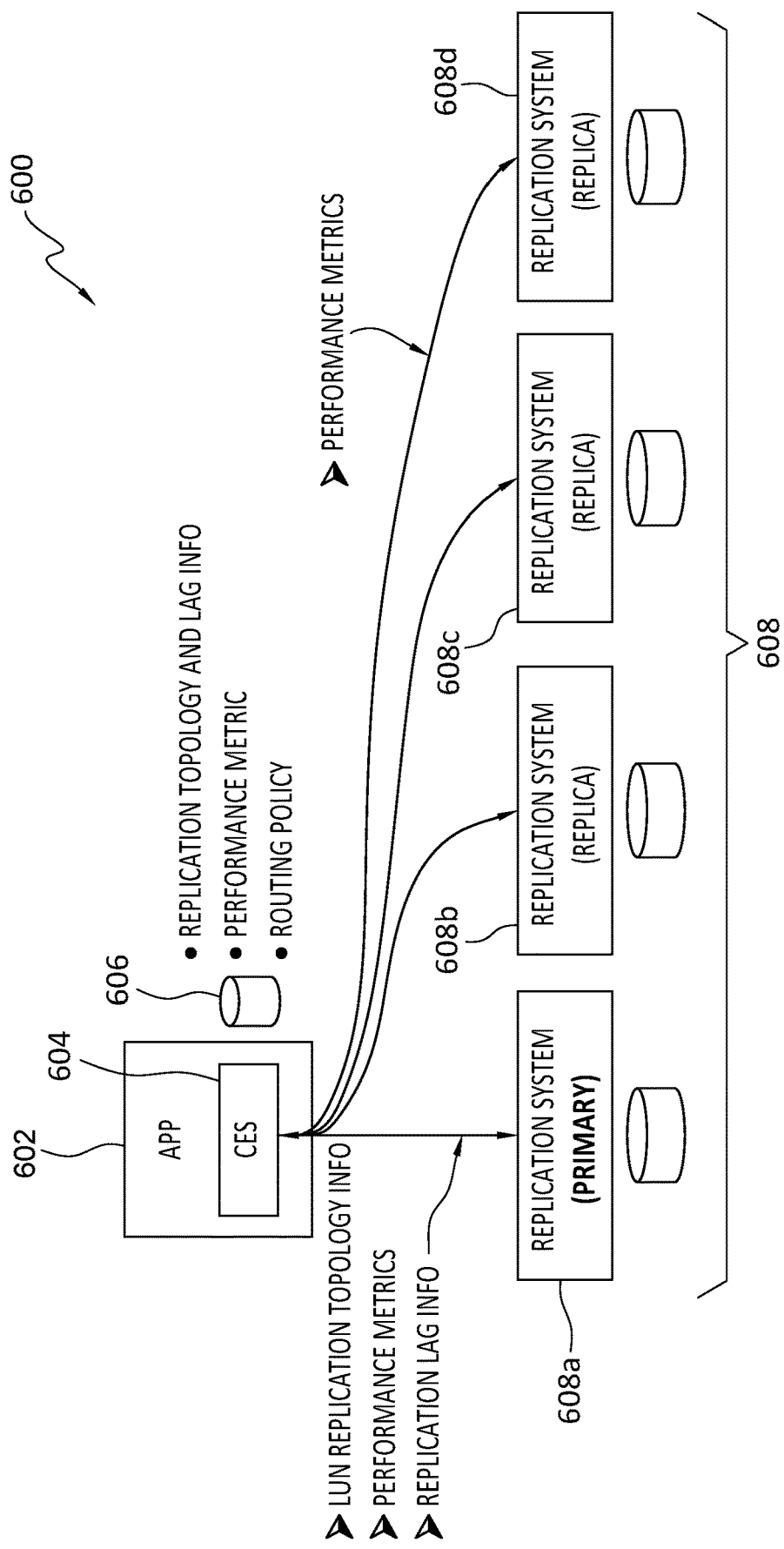
FIG. 5 discloses aspects of routing policies and coordination between routing and replication.

Turning next to FIG. 5, details are provided concerning an example control policy scheme 600. As shown, the scheme 600 may include an application 602 that comprises, or communicates with, CES 604 functionality. A database 606 may be provided that stores information and metadata including, but not limited to, replication topology, that is, topology of a replication system 608, respective replication lag information concerning one or more sites of a replication system, replica site performance metrics such as bandwidth, latency, and throughput, and routing policies. The replication topology may include, for example, LUN replication topology information. Any of the aforementioned data and metadata may be used by the CES 604 to make routing decisions concerning reads and writes, or IOs, issued by the application 602 to the replication system 608. Further, the performance metrics may be pulled by the CES 604 from the replication system 608, and/or the replication system 608 may push the performance metrics to the CES 604.

In the illustrated example of FIG. 5, the replication system 608 may comprise, for example, a single primary replication site 608a, and multiple replication sites 608b, 608c, and 608d, to which data is replicated from the primary replication site 608a. The configuration of the replication system 608 is presented only by way of example, and other embodiments may be configured differently. For example, some replication systems may have multiple primary sites, and multiple replication sites. Thus, the example of FIG. 5 is not intended to limit the scope of the invention in any way.

With continued reference to operational aspects of the scheme 600, the CES 604 may coordinate with replication system 608 in terms, for example, of replication topology, replication load pressure and replication lag status. As well, such information may be exported to, or collected by, a close-to-App routing layer of the CES. Moreover, the CES 604 may make advanced control for purposes like replica-aware, performance-aware, lag-aware, affinity, for example, so that IoT application requests may be automatically and intelligently routed to the replication site that has been determined to offer the best option in terms of, for example, latency and lag performance, load-balance, and/or bandwidth utilization.

D. Example Methods

Figure 6:
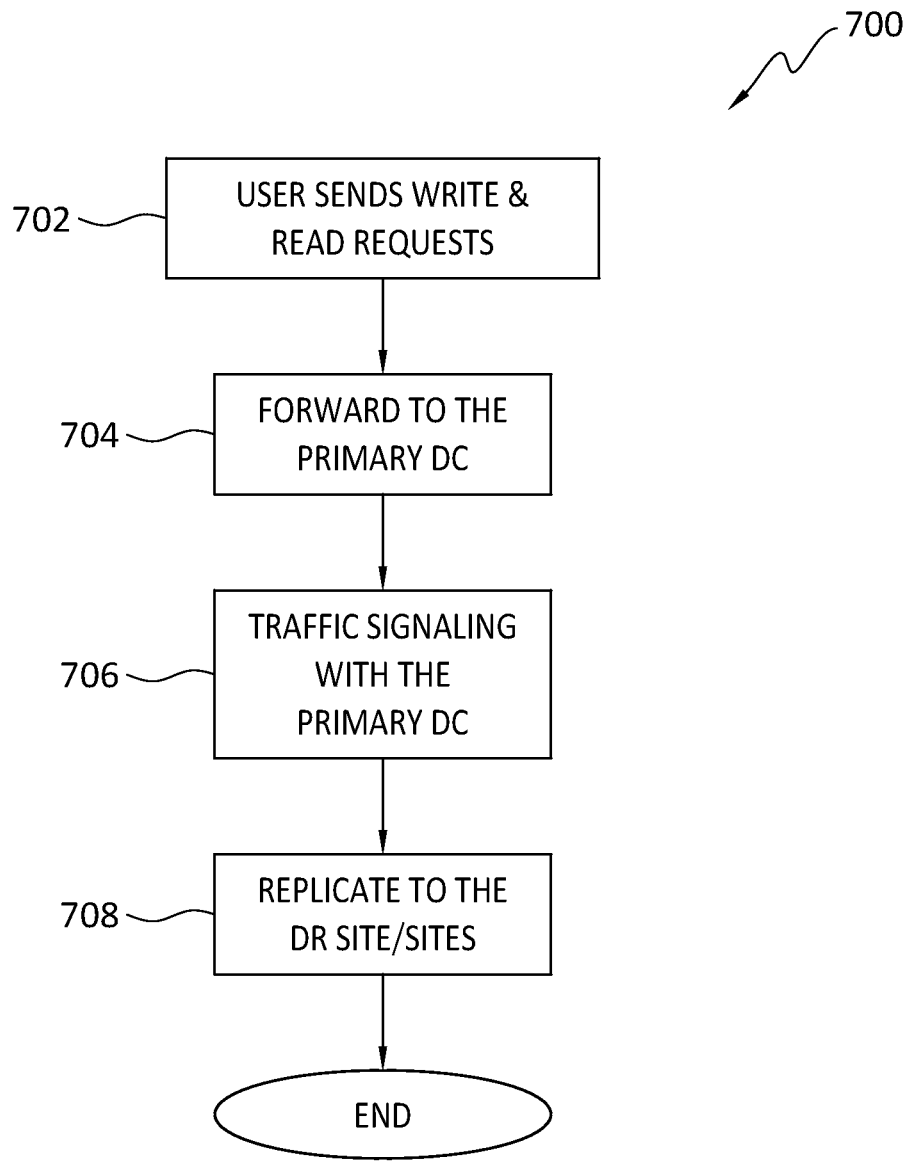
FIG. 6 discloses aspects of a comparative example method for handling IO requests.
Figure 7:
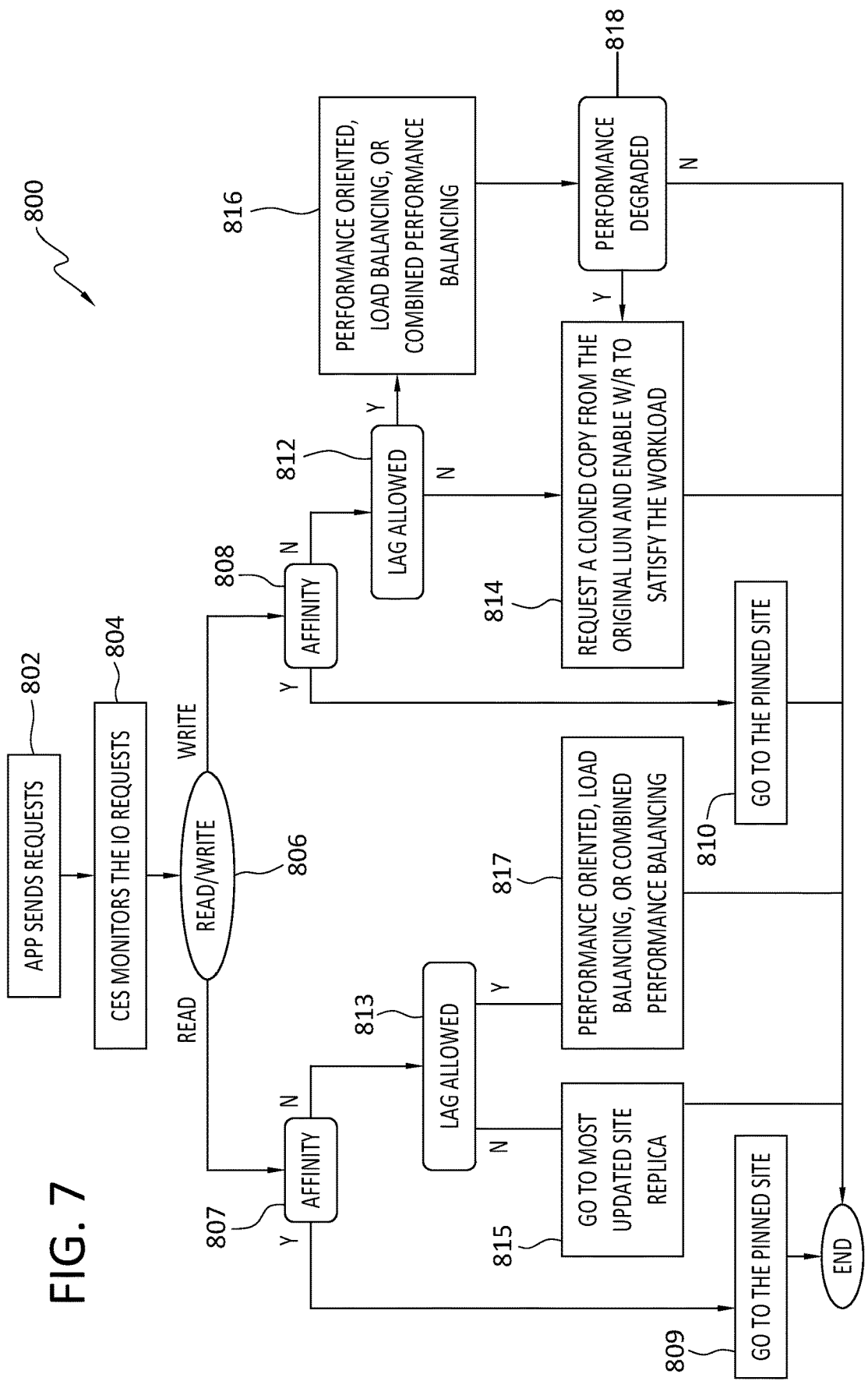
FIG. 7 discloses a method for handling IO requests.

It is noted with respect to the example method of FIGS. 6 and 7 that any of the disclosed processes, operations, methods, and/or any portion of any of these, may be performed in response to, as a result of, and/or based upon, the performance of any preceding process(es), methods, and/or operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Directing attention now to FIG. 6, a comparative hypothetical method 700 is disclosed for the purposes of illustration. In general, the method 700 indicates how a replication process might be performed where no CES functionality is provided.

The method 700 may begin at 702 where a user sends read and write requests, which are then received 704 by a primary datacenter. The user or another entity may provide some sort of traffic signaling 706 to the primary datacenter indicating the traffic, of reads and writes, sent or expected to be sent to the primary datacenter. Based on that information, the primary datacenter may replicate data 708 to one or more replica sites so as to attempt to even out the IO processing workload across the primary datacenter and replication sites.

Turning next to FIG. 7, an example method 800 is disclosed that involves the use of CES functionality in a replication environment. The method 800 may be cooperatively performed by a CES layer and a replication system. The functional allocation shown in FIG. 7 is provided only by way of example, and may vary from one embodiment to another.

The example method 800 may begin when an application transmits an IO request at 802 such as a read request or a write request. The application may be a write-intensive application, a majority of whose IO requests may be write requests. The application may be, for example, an application hosted on an IoT device such as a sensor for example. The IO request may be intercepted, or otherwise received or accessed at 804 by a CES layer or CES plugin, for example.

If the IO is determined 806 to be a write request, the method 800 may advance to 808 where a determination is made as to whether there is an affinity policy in effect. If an affinity policy associated, for example, with the user that sent the IO request, is in effect, the IO request may be passed 810 to a pinned site specified by the affinity policy. On the other hand, if there is no affinity policy in effect, a determination may be made 812 as to whether some degree of latency is permitted in implementing the IO specified in the write request. If no latency is permitted, or if an amount of latency expected to be involved with the IO request exceeds an acceptable latency threshold, the method 800 may advance to 814 where a cloned copy of a volume/LUN is requested that is readable/writable to satisfy the requested IO. That is, the replication site may clone the volume/LUN to which the IO request was directed, and may make that clone writable for the IO request from the user. Thus, the workload represented by the IO request is shifted to the clone without degradation of write performance.

If, however, it is determined 812 that an amount of lag expected to be incurred in performing the requested IO is permissible, the method 800 may advance to 816. At 816, IO request may be handled using a performance-oriented approach that takes into consideration parameters such as latency, throughput, and/or bandwidth utilization associated with any one or more sites of the replication system. Alternatively, the IO request may be handled 816 based on IO load balancing across the sites of the replication system. In still another approach, the handling of the IO request at 816 may be based on performance-oriented considerations and load balancing.

In any case, if the processing 816 results in an unacceptable IO write performance degradation 818, the method 800 may proceed to 814. If the load balancing does not impose an unacceptable IO performance penalty 818, the IO may be written to the site of the replication system that provides the best performance.

The discussion of the method 800 has thus far focused on the handling of write requests from an application. However, if the IO request is determined 806 to be a read request, rather than a write request, the method 800 may advance to 807 where a determination is made as to whether or not an affinity policy applies concerning, for example, the application or user that issued the read request. The determination at 807 may be similar, or identical, to the determination made at 808. If an affinity policy is determined 807 to apply, the method 800 may advance to 809 where the read request is directed to the pinned site specified by the affinity policy.

On the other hand, if no affinity policy is determined 807 to apply, a further determination may then be made 813 as to whether or not any lag is acceptable. The determination 813 may be similar, or identical, to the determination 812. If no lag is permitted, or the amount of expected lag is unacceptable, the read request may be directed 815 to the most up to date replica site, as may be determined with reference to metadata maintained by the replication site, for example. If lag is allowed in the performance of the read operation, the read request may be handled 817 based on performance characteristics and/or load balancing considerations. Thus, the processes performed at 817 may be similar, or identical, to those performed at 816.

Thus, as indicated by these example methods and other disclosure, example embodiments may employ a CES that directs the write requests to a primary site as default, but directs the read requests to the proper site automatically and intelligently with advanced policy control. As such, the example methods may be useful in IoT use cases, among others. Moreover, embodiments may minimize the write delay by optimizing the propagation delay in the cloud user and the datacenter to use in the cloud. As propagation delay has a linear relation with the distance and may be the dominant consideration in a cloud computing environment with Multi-Continents connections (see, e.g., the example map in FIG. 1). Example embodiments may provide a significant enhancement in terms of reducing user access delay, particularly in read intensive applications such IoT data analytics, web applications, and database applications.

E. Further Example Embodiments

Following are some further example embodiments of the invention. These are presented only by way of example and are not intended to limit the scope of the invention in any way.

Embodiment 1. A method, comprising: receiving an IO request from an application; determining if an affinity policy applies to the application that transmitted the IO request; when an affinity policy applies to the application, directing the IO request to a specified site of a replication system; when no affinity policy applies to the application, determining if a lag in replication of the IO request from a primary site to a replication site is acceptable; if a lag in replication of the IO request is acceptable, processing the IO request using performance based parameters and/or load balancing parameters; and if a lag in replication of the IO request is not acceptable, either directing the IO request to a most up to date replica site, or requesting a clone copy of a volume to which the IO request was initially directed and directing the IO request to the cloned copy.

Embodiment 2. The method as recited in embodiment 1, wherein when processing the IO request using performance based parameters and/or load balancing parameters results in unacceptable performance of the IO request, requesting a clone copy of a volume to which the IO request was initially directed and directing the IO request to the cloned copy.

Embodiment 3. The method as recited in any of embodiments 1-2, wherein the IO request is a write request.

Embodiment 4. The method as recited in any of embodiments 1-3, wherein the IO request is a read request.

Embodiment 5. The method as recited in any of embodiments 1-4, wherein a portion of the method is performed by a CES layer at a datacenter.

Embodiment 6. The method as recited in any of embodiments 1-5, wherein a portion of the method is performed by a CES plugin at a user host.

Embodiment 7. The method as recited in any of embodiments 1-6, wherein the IO request is received from a write-intensive application.

Embodiment 8. The method as recited in embodiment 7, wherein the write-intensive application is hosted by an IoT device.

Embodiment 9. The method as recited in any of embodiments 1-8, wherein processing the IO request using performance based parameters and/or load balancing parameters comprises determining a replication site to which the IO request will be sent, and the determining is based on any one or more of: a latency associated with the replication site; a bandwidth utilization associated with the replication site; a workload of the replication site relative to respective workloads of one or more other replication sites; and an IO throughput rate associated with the replication site.

Embodiment 10. The method as recited in any of embodiments 1-9, wherein the IO request is a write request that is written to a primary data storage and management site, and then replicated from the primary data storage and management site to a replica site.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
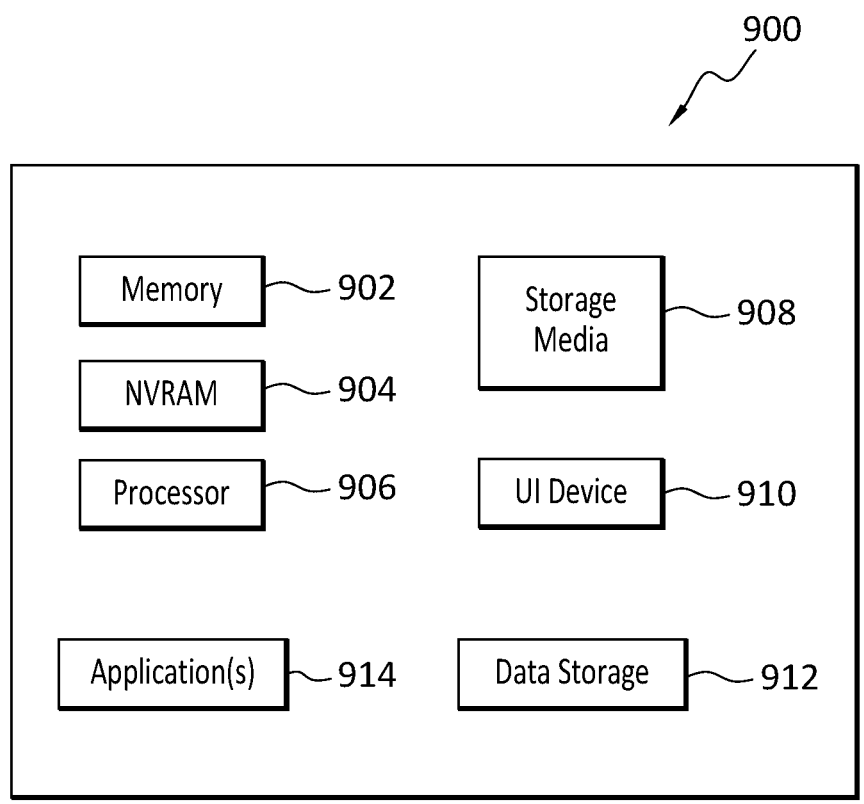
FIG. 8 discloses aspects of an example computing entity that may perform any of the disclosed methods and operations.

With reference briefly now to FIG. 8, any one or more of the entities disclosed, or implied, by FIGS. 1-7 and/or elsewhere herein, may take the form of, or include, or be implemented on, or hosted by, a physical computing device, one example of which is denoted at 900. As well, where any of the aforementioned elements comprise or consist of a virtual machine (VM), that VM may constitute a virtualization of any combination of the physical components disclosed in FIG. 8.

In the example of FIG. 8, the physical computing device 900 includes a memory 902 which may include one, some, or all, of random access memory (RAM), non-volatile memory (NVM) 904 such as NVRAM for example, read-only memory (ROM), and persistent memory, one or more hardware processors 906, non-transitory storage media 908, UI device 910, and data storage 912. One or more of the memory components 902 of the physical computing device 900 may take the form of solid state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving an input/output (IO) request from an application;
   determining if an affinity policy applies to the application that transmitted the IO request; when an affinity policy applies to the application, directing the IO request to a specified site of a replication system;
   when no affinity policy applies to the application, determining if a lag in replication of the IO request from a primary site to a replication site is acceptable;
   if a lag in replication of the IO request is acceptable, processing the IO request using performance based parameters and/or load balancing parameters; and
   if a lag in replication of the IO request is not acceptable, either directing the IO request to a most up to date replica site, or requesting a clone copy of a volume to which the IO request was initially directed and directing the IO request to the cloned copy.

2. The method as recited in claim 1, wherein when processing the IO request using performance based parameters and/or load balancing parameters results in unacceptable performance of the IO request, requesting a clone copy of a volume to which the IO request was initially directed and directing the IO request to the cloned copy.

3. The method as recited in claim 1, wherein the IO request is a write request.

4. The method as recited in claim 1, wherein the IO request is a read request.

5. The method as recited in claim 1, wherein a portion of the method is performed by a Cloud Enabled Service (CES) layer at a datacenter.

6. The method as recited in claim 1, wherein a portion of the method is performed by a Cloud Enabled Service (CES) plugin at a user host.

7. The method as recited in claim 1, wherein the IO request is received from a write-intensive application.

8. The method as recited in claim 7, wherein the write-intensive application is hosted by an Internet of Things (IoT) device.

9. The method as recited in claim 1, wherein processing the IO request using performance based parameters and/or load balancing parameters comprises determining a replication site to which the IO request will be sent, and the determining is based on any one or more of: a latency associated with the replication site; a bandwidth utilization associated with the replication site; a workload of the replication site relative to respective workloads of one or more other replication sites; and an IO throughput rate associated with the replication site.

10. The method as recited in claim 1, wherein the IO request is a write request that is written to a primary data storage and management site, and then replicated from the primary data storage and management site to a replica site.

11. A non-transitory storage medium having stored therein instructions that are executable by one or more hardware processors to perform operations comprising: receiving an input/output (IO) request from an application;
   determining if an affinity policy applies to the application that transmitted the IO request;
   when an affinity policy applies to the application, directing the IO request to a specified site of a replication system;
   when no affinity policy applies to the application, determining if a lag in replication of the IO request from a primary site to a replication site is acceptable;
   if a lag in replication of the IO request is acceptable, processing the IO request using performance based parameters and/or load balancing parameters; and if a lag in replication of the IO request is not acceptable, either directing the IO request to a most up to date replica site, or requesting a clone copy of a volume to which the IO request was initially directed and directing the IO request to the cloned copy.

12. The non-transitory storage medium as recited in claim 11, wherein when processing the IO request using performance based parameters and/or load balancing parameters results in unacceptable performance of the IO request, requesting a clone copy of a volume to which the IO request was initially directed and directing the IO request to the cloned copy.

13. The non-transitory storage medium as recited in claim 11, wherein the IO request is a write request.

14. The non-transitory storage medium as recited in claim 11, wherein the IO request is a read request.

15. The non-transitory storage medium as recited in claim 11, wherein one or more of the operations are performed by a Cloud Enabled Service (CES) layer at a datacenter.

16. The non-transitory storage medium as recited in claim 11, wherein one or more of the operations are performed by a Cloud Enabled Service (CES) plugin at a user host.

17. The non-transitory storage medium as recited in claim 11, wherein the IO request is received from a write-intensive application.

18. The non-transitory storage medium as recited in claim 17, wherein the write-intensive application is hosted by an Internet of Things (IoT) device.

19. The non-transitory storage medium as recited in claim 11, wherein processing the IO request using performance based parameters and/or load balancing parameters comprises determining a replication site to which the IO request will be sent, and the determining is based on any one or more of: a latency associated with the replication site; a bandwidth utilization associated with the replication site; a workload of the replication site relative to respective workloads of one or more other replication sites; and an IO throughput rate associated with the replication site.

20. The non-transitory storage medium as recited in claim 11, wherein the IO request is a write request that is written to a primary data storage and management site, and then replicated from the primary data storage and management site to a replica site.

* * * * *